W. M. SANDERS.
APPARATUS FOR CONCENTRATING ORES.
APPLICATION FILED MAR. 27, 1907.

911,077.

Patented Feb. 2, 1909.

Witnesses:

Inventor:
Walter Murray Sanders
by Byrnes & Townsend
Att'ys.

UNITED STATES PATENT OFFICE.

WALTER MURRAY SANDERS, OF MARION, KENTUCKY.

APPARATUS FOR CONCENTRATING ORES.

No. 911,077.  Specification of Letters Patent.  Patented Feb. 2, 1909.

Application filed March 27, 1907. Serial No. 364,907.

*To all whom it may concern:*

Be it known that I, WALTER MURRAY SANDERS, a citizen of the United States, residing at Marion, in the county of Crittenden and State of Kentucky, have invented certain new and useful Improvements in Apparatus for Concentrating Ores, of which the following is a specification.

This invention is an apparatus for concentrating ores by the so-called "flotation process," said process depending, as is well understood, upon the capacity exhibited by certain solutions for raising or elevating certain mineral particles, notably zinc sulfid.

The object of the invention is to provide a simple and inexpensive apparatus, having a large capacity and a high working efficiency.

For a full understanding of the invention reference is made to the accompanying drawings wherein—

Figure 1:
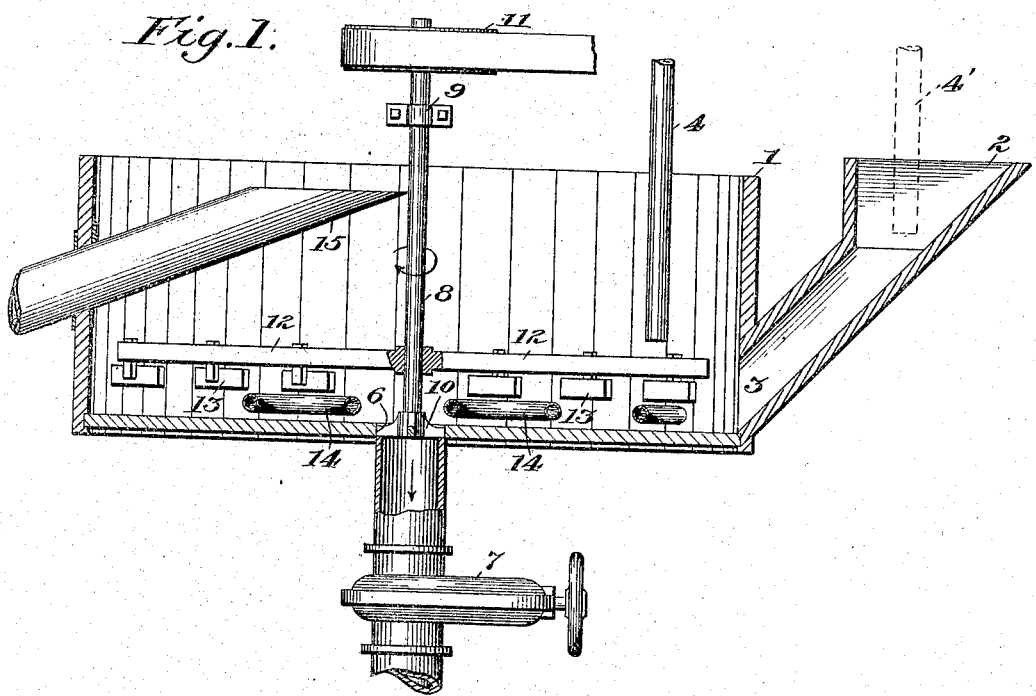
Figure 2:
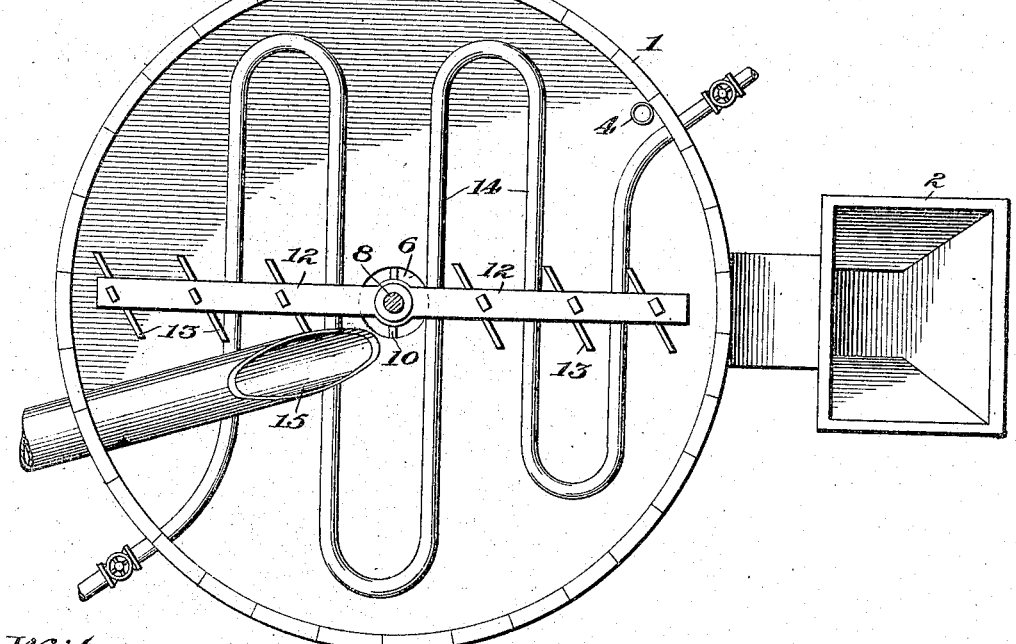

Figure 1 is a vertical sectional view of a preferred form of apparatus; and Fig. 2 is a plan view of the same.

Referring to the figures, 1 represents a tank, preferably cylindrical in form, provided with a hopper 2 through which the ore to be concentrated is to be introduced in a suitably divided form, the hopper preferably communicating with the tank at a point 3 near the base of the latter.

4 indicates a solution inlet pipe, shown as arranged near the periphery of the tank. A central discharge aperture 6 is provided for the tailings, controlled by a valve 7.

A shaft 8, vertically mounted in the center of the tank in upper and lower bearings 9, 10, carries at its upper end a pulley 11. Secured to the lower portion of the shaft 8 are two or more arms 12, carrying rakes or blades 13 so disposed as to impart a whirling motion to the solution and also to transfer such portions of the ore as are not elevated by the solution from the periphery to the center of the tank. A steam pipe 14 is so disposed in the bottom of the tank as to evenly heat the solution therein.

15 represents an overflow pipe for the solution, together with the concentrate or such mineral components as rise to the surface of the solution.

The operation of the apparatus will be described by reference to a specific example, it being understood, however, that the apparatus may be employed for the treatment of any suitable ore or concentrate by means of any solution capable of elevating certain of the mineral constituents. Assuming that the ore contains as its principal metal-bearing constituents the minerals sphalerite and galena, it is charged in a state of fine division through the hopper 2, the tank having been previously filled with a suitable solution, as, for instance, a non-acid solution as described in my Patent 805,382, issued November 21, 1905. The arms 12 carrying the blades 13 being rotated in the direction indicated by the arrow, will thoroughly agitate and distribute the charge, and at the same time will transfer such portions as are not elevated to the central discharge 6; the sphalerite in the meantime rises to the surface of the solution and is discharged from the vessel through the overflow pipe 15. Solution is admitted at 4 in volume sufficient to effect the continuous discharge of the concentrate through the overflow.

The rotating rakes or blades 13 perform a triple function as follows; first, to thoroughly agitate the ore; second, to carry that portion of the ore which does not rise to the surface of the solution to the tailings discharge 6; and third, to impart a whirling motion to the solution, as a result of which there is a slight cavitation at the center of the surface, which causes the particles which have been elevated to pass at once to the overflow pipe 15. Under these conditions the floating particles are much more rapidly discharged and their liability to subsidence is correspondingly decreased, thus greatly increasing the efficiency of the operation. The combined effect is to render the operation highly efficient, not less than 95 per cent. of the zinc sulfid in the original ore being discharged through the pipe 15 under favorable conditions.

It has been found that certain ores exhibit so high a degree of activity as to render it difficult to feed them at a sufficient rate through the hopper 2; in such cases it is advisable to introduce a part or all of the solution through the hopper together with the ore, means therefor being indicated in dotted lines at 4' in Fig. 1.

I do not limit myself to the mechanical means shown for imparting a whirling motion to the liquid and for transferring the tailings to the central discharge.

The outlet 15 may be disposed centrally in the tank 1, encircling the shaft 8.

I claim:—

1. Apparatus for concentrating ore by flotation, comprising a tank having means for introducing ore and solution below the normal liquid surface, a central discharge gate for tailings, a substantially central overflow for concentrate, and means for imparting a whirling motion to the liquid in the tank, substantially as described.

2. Apparatus for concentrating ore by flotation, comprising a tank having means for introducing ore and solution below the normal liquid surface, a central discharge gate for tailings, a substantially central overflow for concentrate, and a mechanical agitator constructed to impart a whirling motion to the liquid in the tank, to agitate the ore, and to transfer the tailings to said central discharge gate, substantially as described.

3. Apparatus for concentrating ore by flotation, comprising a tank having means for introducing ore and solution below the normal liquid surface, a discharge gate for tailings, a substantially central overflow for concentrate, and means for heating the contents of the tank, substantially as described.

In testimony whereof, I affix my signature in presence of two witnesses.

WALTER MURRAY SANDERS.

Witnesses:
R. L. Moore,
O. S. Mann.